United States Patent [19]

Mashimo

[11] 4,240,511

[45] Dec. 23, 1980

[54] DRILLING MACHINE CENTERING ARRANGEMENT

[75] Inventor: Toru Mashimo, Hiroshima, Japan

[73] Assignee: Toyo Kogyo Co., Ltd., Hiroshima, Japan

[21] Appl. No.: 914,746

[22] Filed: Jun. 7, 1978

[30] Foreign Application Priority Data

Jun. 7, 1977 [JP] Japan .................................. 52/66997

[51] Int. Cl.$^2$ ............................................. E21C 11/02
[52] U.S. Cl. .......................................... 173/1; 173/43
[58] Field of Search ....................... 173/1, 2, 4, 20, 21, 173/43; 248/2, 16; 408/3, 13

[56] References Cited

U.S. PATENT DOCUMENTS

| | | | |
|---|---|---|---|
| 3,481,409 | 12/1969 | Westerlund | 173/43 |
| 3,891,039 | 6/1975 | Lagerstrom | 173/21 X |
| 3,896,885 | 7/1975 | Dahlstrom et al. | 173/43 X |
| 3,973,747 | 8/1976 | Jagerstrom | 173/43 X |
| 4,113,033 | 9/1978 | Lindblad | 173/1 |

*Primary Examiner*—Lawrence J. Staab
*Attorney, Agent, or Firm*—Wenderoth, Lind & Ponack

[57] ABSTRACT

A centering arrangement for a drilling machine or the like mounted on a boom or jib on a truck or the like for drilling rock, for example, and in which, for centering the drilling machine, the machine is moved from a reference point on a drilling pattern plane to a reference point on a working plane, and the amount of shifting for achieving the centering is supplied to a unit for adjusting the working distance and direction values for the desired drilling point in the drilling pattern plane to achieve the working distance and direction values of the actual drilling point on the working plane. These are used for moving the boom structure of the drilling machine to the actual drilling point for quick and accurate.

5 Claims, 7 Drawing Figures

DRILLING MACHINE CENTERING ARRANGEMENT

BACKGROUND OF THE INVENTION

The present invention relates to a centering arrangement and more particularly, to a centering arrangement of a drilling machine or the like mounted on a boom or jib structure which is loaded on a truck or the like, in which arrangement, a drilling pattern obtainable on a temporarily provided drilling pattern on a drilling pattern plane in a rectangular coordinate system and which is based on the position of the drilling machine is adjusted to an actual drilling pattern on a working plane corresponding to the actual working face for centering of the drilling machine without mechanically moving the position of the truck.

Conventionally, when a tunnel or the like, for example, is excavated by a drilling machine such as machine drill, i.e., rock drill, rock borer, etc., mounted on a boom structure, it is first necessary to bring a reference point of the boom structure in a drilling pattern plane in rectangular coordinate system into coincidence or superposition with a reference point in a working plane in a rectangular coordinate system for drilling according to the drilling pattern on the drilling pattern plane. Accordingly, it has been conventional practice to lift the truck loaded with the boom structure by a jack or the like or to mechanically slide the position of such truck for centering of the drilling machine. The known centering practice as described above, however, has disadvantages in that considerable time as well as special skill are required to mechanically move the position of the truck for correction, with insufficient centering accuracy, and power separate from that for the boom is required for such mechanical movement, resulting in high cost of the centering operation.

SUMMARY OF THE INVENTION

Accordingly, an essential object of the present invention is to provide a centering arrangement for a drilling machine or the like mounted on a boom structure loaded on a truck, which arrangement is capable of rapidly and accurately effecting the centering of the drilling machine in an efficient manner without the necessity for moving the truck for the centering.

Another important object of the present invention is to provide a centering arrangement of the above described type which is so arranged that the position and direction of the boom structure is moved from a reference point in a drilling pattern plane with rectangular coordinates to a reference point in the plane of an actual drillng pattern in rectangular coordinate system established immediately in front of a working face, and the amount of displacement for centering of the boom structure is used to adjust the values of the working distance and direction of the boom structure relative to the drilling pattern plane for drilling points therein to move the boom structure to the correct drilling positions in the actual drilling plane.

A further object of the present invention is to provide a centering arrangement of the above described type which is simple in construction and stable in functioning, and can readily be incorporated into drilling machines and the like of various types at low cost.

In accomplishing these and other objects, according to the present invention, there is provided a centering arrangement for a drilling machine or the like in which the boom structure at the reference point on the drilling pattern plane is shifted to the correct position of the reference point on the working plane, and the amount of shifting is converted from a boom coordinate system to rectangular coordinate system by converter means, and then used to adjust or correct distance and direction values for a desired drilling point by an arithmetic unit so that the desired drilling point on the drilling pattern plane is brought into coincidence with the actual drilling point on the working plane for achieving the ideal drilling pattern for the boom structure. Thus it is possible to carry out the centering of a desired drilling pattern on a working plane quickly and accurately without the necessity for mechanically shifting the position of the truck or the like on which the drilling apparatus is mounted.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals and symbols throughout several views of the accompanying drawings.

DETAILED DESCRIPTION OF THE INVENTION

Figure 1:
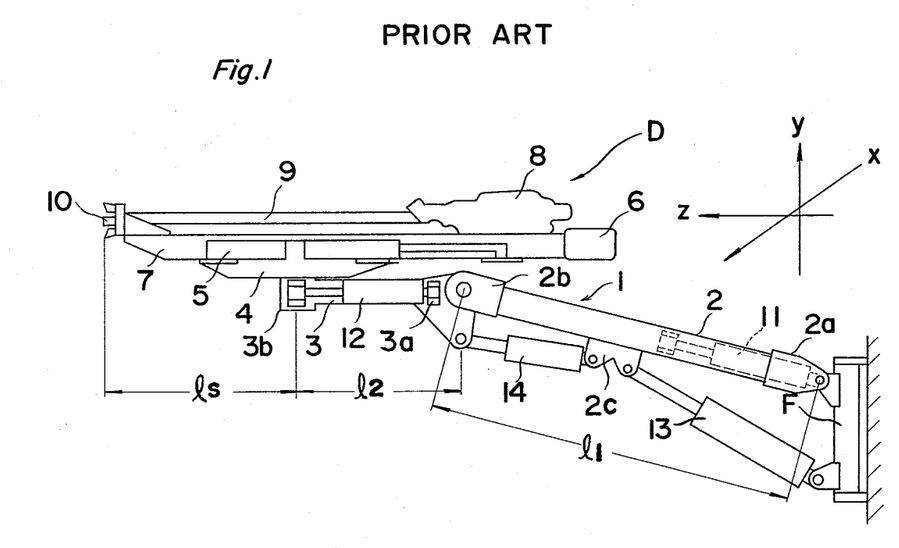
FIG. 1 is a side elevational view showing a conventional drilling machine mounted on a boom structure to which a centering arrangement according to the present invention may be applied.

Referring now to the drawings, there is shown in FIG. 1 one example of a conventional drilling machine and boom construction D to which the centering arrangement according to the present invention may be applied. The drilling machine and boom construction D of FIG. 1 generally comprises a boom structure or boom means 1 including a first boom 2 pivotally connected at its one end 2a on a base F secured to a vehicle such as a truck or the like (not shown), a second boom 3 pivotally connected at its one end 3a to the other end 2b of the first boom 2, and a hydraulic cylinder 5 for a guide cell 7 secured to the other end 3b of said second boom 3 by a cell mounting 4. The guide cell 7 has a feed motor 6 attached at its rear end and is slidably mounted on the hydraulic cylinder 5 for reciprocation of said guide cell 7 by actuation of the hydraulic cylinder 5, and a drilling machine 8 having a bit 10 attached to one end of a rod 9 is reciprocatingly mounted on the guide cell 7 for advancing and retracting movement of said drilling machine 8 during its drillng operation. The boom means 1 on which the drilling machine 8 is mounted is arranged to be displaceable in swinging movement toward the left and right in a horizontal direction (direction x in FIG. 1), back and forth in the horizontal direction (direction z in FIG. 1) and also vertically (direction y in FIG. 1), and for the above purpose, a first hydraulic cylinder 11 for boom swing and a second hydraulic cylinder 12 for guide cell swing are respectively connected to the first boom 2 and second boom 3 for driving the latter in the swinging movement in the horizontal direction, while a third hydraulic cylinder 13 for boom lift is pivotally connected at its one end to the base F and at its other end to a bracket 2c secured to an approximately central portion of the first boom 2, with a fourth hydraulic cylinder 14 for guide cell lift being connected at its one end to the bracket 2c and at its other end to the end 3a of the second boom 3 for vertically driving the first and second booms 2 and 3 as shown in FIG. 1.

Figure 2:
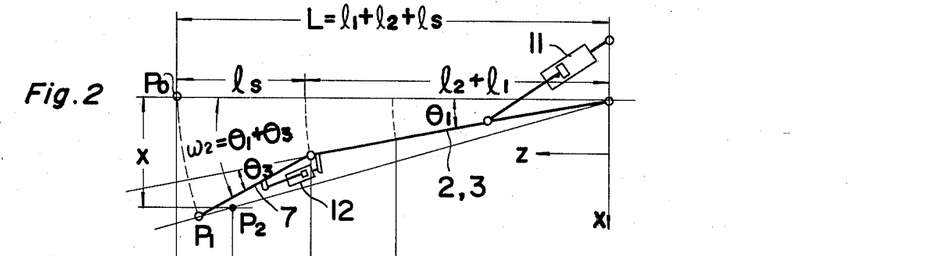
FIGS. 2 and 3 are diagrams for explaining displacement of the booms of the boom structure of FIG. 1.
Figure 3:
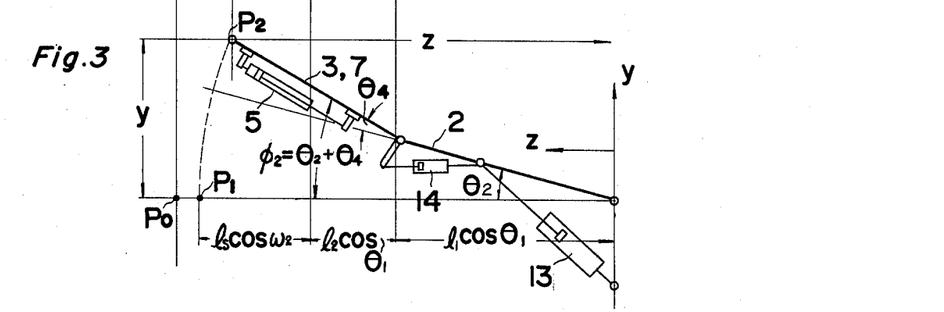

Referring particularly to FIGS. 2 and 3, the relation between the amount of movement of each of the hydraulic cylinders 5 and 11 to 14 for the guide cell and the distal end of the boom means 1 (i.e., the distal end of the guide cell 7) moving according to the movement of such hydraulic cylinders 5 and 11 to 14 will be analyzed hereinbelow. In FIG. 1, the length of the first boom 2 is represented by $l_1$, and that of the second boom 3 by $l_2$, while the length from the forward end 3b of the second boom 3 to the forward end of the guide cell 7 (i.e., the amount of movement of the guide cell 7) is denoted by $l_S$. It is to be noted here, however, that the length $l_S$ denotes the distance to the distal end of the bit 10 when the bit 10 is projecting from the forward end of the guide cell 7.

With reference to a drilling pattern rectangular coordinate system $Q_A$ which has the x-z plane extending in the horizontal direction and the x-y plane extending in the vertical direction relative to the base on which the boom structure is mounted, when the boom means 1 is on the z axis, the distal end thereof is located at a point $P_0$ in FIG. 3. Upon actuation of the first hydraulic cylinder 11 for the boom swing and second hydraulic cylinder 12 for the guide cell swing so as to move the first and second booms 2 and 3 through an angle $\theta_1$ and the guide cell 7 through an angle $\theta_3$ in the horizontal plane (i.e., plane x-z in the drawing) by the extension of the rod of the hydraulic cylinder 11 and retraction of the rod of hydraulic cylinder 12, the distal end is shifted from the point $P_0$ as described above to a point $P_1$. Thereafter, when the first and second booms 2 and 3 are respectively moved in the vertical plane (i.e., plane y-z in the drawing) through angles $\theta_2$ and $\theta_4$ by actuation of the third hydraulic cylinder 13 for the boom lift and the fourth hydraulic cylinder 14 for the guide cell lift, the distal end is shifted from point $P_1$ to a point $P_2$. The position $x_2$, $y_2$ and $z_2$ of the point $P_2$ in the temporary rectangular coordinate system $Q_A$ and direction $\omega_2$ and $\phi_2$ of the guide cell 7 are given by the following equation (1).

Position:

$$x_2 = l_1 \sin\theta_1 \cdot \cos\theta_2 + \{l_2 \sin\theta_1 l_s \sin(\theta_1+\theta_3)\}\cdot\cos(\theta_2+\theta_4)$$

$$y_2 = l_1 \cos\theta_1 \cdot \sin\theta_2 + \{l_2 \cos\theta_1 + l_s \cos(\theta_1+\theta_3)\}\cdot\sin(\theta_2+\theta_4)$$

$$z_2 = l_1 \cos\theta_1 \cdot \cos\theta_2 + \{l_2 \cos\theta_1 + l_s \cos(\theta_1+\theta_3)\}\cdot\cos(\theta_2+\theta_4)$$

Direction:

Horizonal direction $\omega_2 = \theta_1 + \theta_3$

Vertical direction: $\phi_2 = \theta_2 + \theta_4$ (1)

In other words, the position of the point $P_2$ and the direction of the guide cell relative to the x-z and y-z planes are denoted by the equation (1). in the rectangular coordinate system $Q_A$ ($x_2,y_2,z_2$, $\omega_2$, $\phi_2$) and also in the coordinate system $Q_B$ ($\theta_1$, $\theta_2$, $\theta_3$, $\theta_4, l_s$) of the boom means 1, which systems are interchangeable with each other. It is to be noted that, since lengths $l_1$ and $l_2$ are constant values, positions in the boom coordinate system $Q_B$ can be shown as parameters of $\theta_1$, $\theta_2$, $\theta_3$, $\theta_4$ and $l_s$.

$$\therefore Q_A(x_2,y_2,z_2,\omega_2,\phi_2) \rightleftarrows Q_B(\theta_1,\theta_2,\theta_3,\theta_4,l_s)$$

Accordingly, controlling of the positions and directions of the guide cell at points $P_0$, $P_1$, $P_2$ ... and $P_n$ in the rectangular coordinate system of the drilling pattern plane can be achieved, if a coordinate converter $[Q_A \rightarrow Q_B]$ and a positioning servo control unit for the angles $\theta_1$, $\theta_2$, $\theta_3$ and $\theta_4$ and length $l_s$ are provided.

On the other hand, in a centering action for bringing into coincidence with an actual reference point $P'_O$ in a working plane $S_2$ defined by a rectangular coordinate system $Q'_A$ in front of a working face, a refernce point $P_O$ on a drilling pattern plane $S_1$ in the rectangular coordinate system $Q_B$ provided for the boom structure 1 on the basis of the position of the base on which the boom structure 1 is mounted, the following order of steps is followed.

(i) The truck or the like carrying the base is placed so as to confront the actual working face so that the drilling pattern plane reference point is located within a predetermined distance range with respect to the reference point in the working plane.

Figure 4:
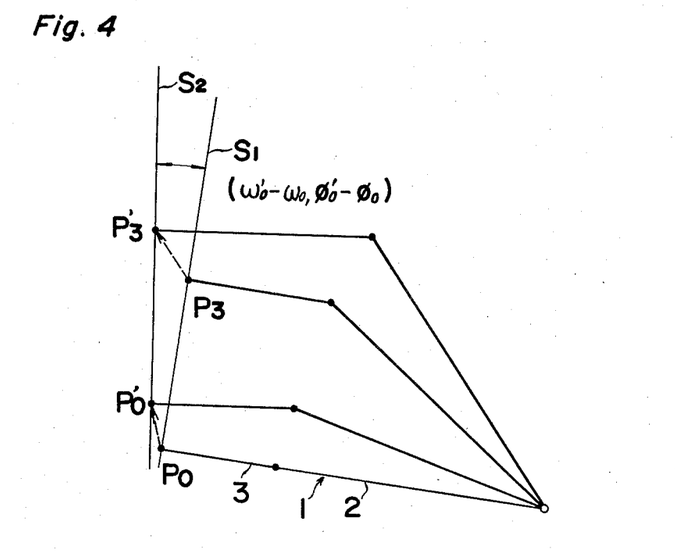
FIG. 4 is a schematic diagram showing a side elevational view of the boom structure of FIG. 1 for explaining the centering arrangement according to the present invention.

(ii) As shown in FIG. 4, the boom means 1 is moved in a centering movement to bring the reference point $P_0$ of the distal end of the boom structure 1 in the drilling pattern plane into adjustment or superposition with the reference point $P'_0$ preliminarily established in the working plane $S_2$ to obtain values for the reference point $P'_O$ ($Q'_B$) in the working plane $S_2$ in the boom coordinate system $Q'_B$.

(iii) The values for the reference point $P'_0(Q'_B)$ in the working plane $S_2$ in the boom coordinate system all converted to the values for point $P'_0(Q'_A)$ in the rectangular coordinate system $Q'_A$.

(iv) Using the values for the above points $P_0$ and $P'_{O'}$ the drilling point $P_3$ in the drilling pattern plane $S_1$ is corrected according to the method described below to obtain values to drive the boom structure to move it to the actual drilling point $P'_3$ in the working plane $S_2$.

More specifically, the values for the drilling point $P'_3$ are obtained by the procedure as follows. It should be noted here that for this purpose, the values of the positions and the angles of the guide cell at the reference point $P_O'$ reference point $P'_0$, drilling point $P_3$ and drilling point $P'_3$ are as follows.

|  | $P_0$ | $P'_0$ | $P_3$ | $P'_3$ |
| --- | --- | --- | --- | --- |
| Positions | $x_0,y_0,z_0$ | $x'_0,y'_0,z'_0$ | $x_3,y_3,z_3$ | $x'_3,y'_3,z'_3$ |

|                     | $P_0$      | $P'_0$      | $P_3$      | $P'_3$      |
|---------------------|------------|-------------|------------|-------------|
| Horizontal direction| $\omega_0$ | $\omega'_0$ | $\omega_3$ | $\omega'_3$ |
| Vertical direction  | $\phi_0$   | $\phi'_0$   | $\phi_3$   | $\phi'_3$   |

(a) Supposing $R = |P'_0 P'_3|$, the relation is worked out in the rectangular coordinate system.

$$R = |P'_0 P'_3| = |P_0 P_3| = \{(x_3-x_0)^2 + (y_3-y_0)^2 + (z_3-z_0)^2\}^{\frac{1}{2}}$$

(b) Subsequently, the following equations are obtained when magnitudes of R in the x, y and z directions are respectively represented by $R_x$, $R_y$ and $R_z$.

$$R_x = x'_3 - x_3 = R \sin(\omega'_0 - \omega_0) \cos(\phi'_0 - \phi_0)$$

$$R_y = y'_3 - y_3 = R \cos(\omega'_0 - \omega_0) \sin(\phi'_0 - \phi_0)$$

$$R_z = z'_3 - z_3 = R \cos(\omega'_0 - \omega_0) \cos(\phi'_0 - \phi_0) \quad (2)$$

(c) Additionally, with respect to the horizontal and vertical directions, following equations are established.

$$\omega'_3 - \omega_3 = \omega'_0 - \omega_0$$

$$\phi'_3 - \phi_3 = \phi'_0 \phi_0 \quad (3)$$

Accordingly, the values of the position and direction of the guide cell at the drilling point $P'_3$ are given by the following equations.

$$x'_3 = x_3 + R \sin(\omega'_0 - \omega_0) \cos(\phi'_0 - \phi_0)$$

$$y'_3 = Y_3 + R \cos(\omega'_0 - \omega_0) \sin(\phi'_0 - \phi_0)$$

$$z'_3 = z_3 + R \cos(\omega'_0 - \omega_0) \cos(\phi'_0 - \phi_0)$$

$$\omega'_3 = \omega_3 + \omega'_0 - \omega_0$$

$$\phi'_3 = \phi_3 + \phi'_0 - \phi_0 \quad (4)$$

(v) The values for the drilling point $P'_3(Q'_A)$ in the rectangular coordinate system are converted into values in the boom coordinate system to obtain $P'_3(Q'_B)$, according to which the boom structure 1 is driven so as to be properly positioned at the drilling point $P'_3$.

As seen from the above description, if a converter for converting the values for the ideal reference point $P'_0(Q'_B)$ described in the above item (iii) into values for the point $P'_0(Q'_A)$ in the rectangular coordinate system and an arithmetic unit for correcting the values for drilling point $P_3$ to values for the point $P'_3$ from the values for the points $P_0$ and $P'_0$ referred to in the above item (iv) are provided, centering on the working plane of the positions in the drilling pattern plane established relative to the boom means can be effected.

Figure 5:
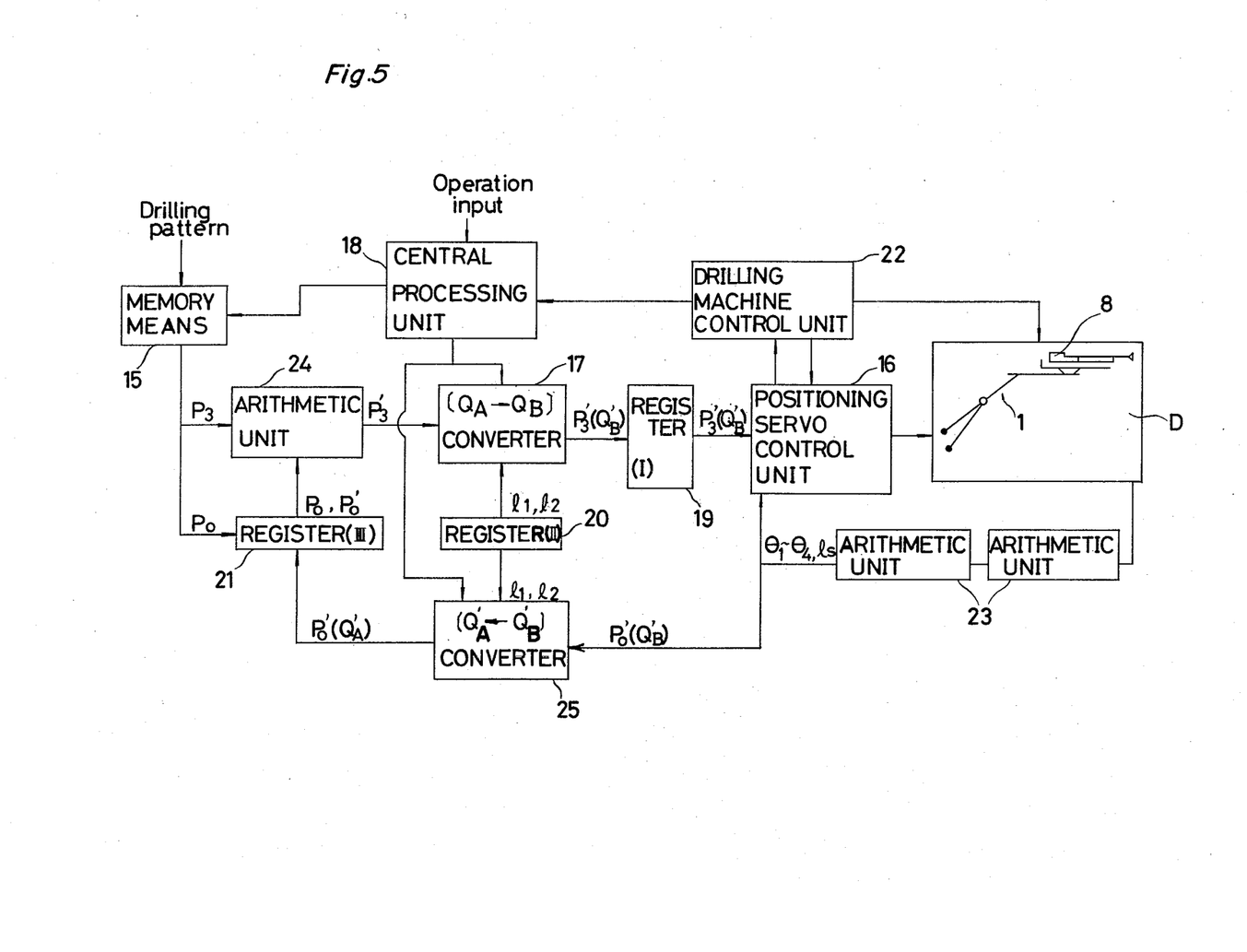
FIG. 5 is a block diagram of the circuit of the centering arrangement according to the present invention.

FIG. 5, and arithmethic unit 23 is provided to calculate values of working distance ls and working directions $\theta_1$–$\theta_4$ of the boom means from the value of the displacement of the hydraulic cylinder 5 for the guide cell 7 and the hydraulic cylinders 11–14 for the first and second booms 2 and 3 when hydraulic fluid is supplied to the hydraulic cylinders 5 and 11–14 for adjusting the position of the boom from Po to P'o. This arithmetic unit 23, is constructed to calculate the working distance and direction values ls and $\theta_1$–$\theta_4$ of the boom means by the use of an encoder or the like.

The two arithmetic units or detectors 23 operate to work out the angles of displacement of the boom means 1 upon receipt of detection signals indicating the displacements of the hydraulic cylinders 11 to 14 for driving the first and second booms 2 and 3, and of the hydraulic cylinder 5 for the guide cell 7, and are coupled to the positioning servo control unit 16 so as to calculate and feed back the angles of displacement ($\theta_1$, $\theta_2$, $\theta_3$ and $\theta_4$) and the amount of displacement or amount of movement $l_s$ of the guide cell 7 for positioning of said boom means 1.

Figure 6:
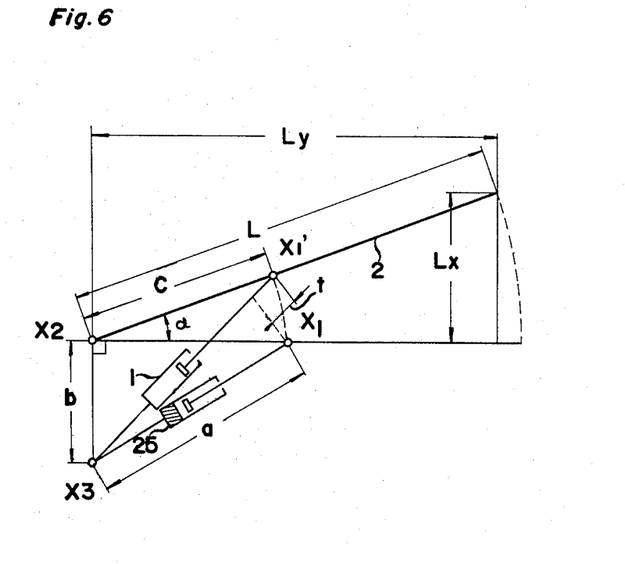
FIG. 6 is a schematic diagram showing the relation between the angles of displacement of the boom and amounts of displacement of hydraulic cylinders for driving the boom.

Referring particularly to FIG. 6 showing the first boom 2 in a simplified form, the principle for detecting the angles of displacement $\theta_1$ to $\theta_4$ directly from the displacements of the driving hydraulic cylinders 11 to 14 without the arithmetic units 23 or indirectly through the arithmetic units 23 will be explained hereinbelow.

In FIG. 6, when the first boom 2 is in a horizontal state, a triangle $\Delta X_1 X_2 X_3$ can be defined which is right-angled. Accordingly if the lengths of the respective sides thereof are represented by a, b and c, the following relation is established.

$$a^2 = b^2 + c^2 \quad (2)$$

If the point $X_1$ is shifted to a point $X'_1$, by moving boom 2 upward through an angle along side a distance between the points $X_1$ and $X'_1$ is increased by t, and the following equation is established.

$$(a + t)^2 = (b + c \sin\alpha)^2 + (c \cos\alpha)^2 \quad (3)$$
$$= b^2 + c^2 + 2bc \sin\alpha$$

From the equations (2) and (3), $$t^2 = 2at = 2bc \sin\alpha$$
$$\sin\alpha = \frac{t^2 + 2at}{2bc} \quad (4)$$

Therefore, the angle $\alpha$ may be represented by the following equation.

$$\alpha = \sin^{-1} \frac{t^2 + 2at}{2bc} \quad (5)$$

In the above equation (5), if a/bc t is replaced by T.

$$\alpha = \sin^{-1} \{\frac{bc}{2a^2} T^2 + T\}$$

and if $bc/a^2$ is further replaced by $K_1$, the equation (5) may be replaced as follows.

$$\alpha = \sin^{-1} (\frac{K_1}{2} T^2 + T) \quad (6)$$

As described above, the angle $\alpha$ of the boom is obtained by the displacement T of the hydraulic cylinder by the use of the equation (6). More specifically, the result as described above is achieved by the employment of the two arithmetic units 23 connected as follows and carrying out the indicated calculation (in this case, employment of digital arithmetic units is advantageous).

Figure 7:
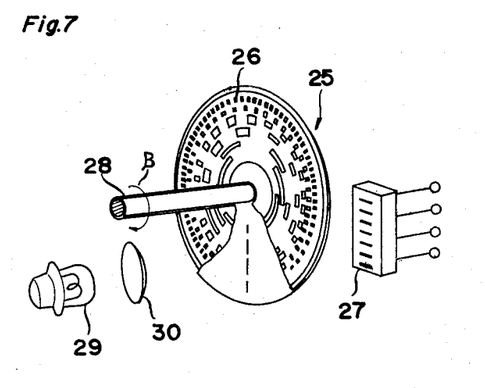
FIG. 7 is an exploded view of an encoder employed in the arrangement of FIG. 5.

For detection of the value T, an encoder 25 as shown in FIG. 7 may be incorporated in each of the driving hydraulic cylinders. The encoder 25 is installed on the axis of each of the driving hydraulic cylinders 11 to 14 at the inner end of the cylinder and includes an apertured rotary disc 26 fixed to a shaft 28 and a detector 27 accommodated in a casing (not shown) secured to the particular hydraulic cylinder for rotation of the rotary disc 26 by the shaft 28 as hydraulic medium is introduced into the hydraulic cylinder. The disc 26 comprises means to produce a 1, 0 pattern as a physical representation of the amount of flow of hydraulic fluid for detection by the detector 27. The encoder 25 employs light as the medium for physical representation and further includes a light source in the form of a lamp 29 and a condenser lens 30 to apply light onto the surface of the rotary disc 26 so that the light which passes through the apertures is detected by the detector 27 in the form of, for example, a photo transistor (not shown).

The relation between angle $\beta$ through which the rotary disc 26 rotates and the output signal T is represented by the following equation.

$$T = K_2 \beta \tag{7}$$

where $K_2$ is a constant. However, if the pattern of apertures in the disc of the encoder is used a function generator satisfying the equation (6) instead of the above equation (7), the angle $\alpha$ can be directly obtained from the encoder 25.

For obtaining such pattern of the apertures to operate as a function generator (encoder) satisfying the equation (6), the equation (7) is substituted into the equation (6).

$$\alpha = \sin^{-1}\left(\frac{K_1 K_2{}^2}{2}\beta^2 + K_2\beta\right)$$

Solving the above equation for $\beta$, the following relation is obtained.

$$\beta = \frac{-1 + \sqrt{1 + 2K_1 \cdot \sin\alpha}}{K_1 K_2} \tag{8}$$

wherein:
(1) $\beta > C$
(2) $1 + 2K_1 \sin \alpha > 0$

Thus, the relation of the pattern angle $\beta$ of the encoder with respect to the angle $\alpha$ of each arm of the boom means 1 is obtained.

Accordingly, by obtaining the pattern angle $\beta$ by utilization of the encoder 25 as a particular function generator, the distances $L_X$ and $L_Y$ in FIG. 6 can consequently be detected.

The arithmetic unit 23 is connected to a converter 25 for feeding the working distance and direction values of the boom means calculated by the arithmetic unit 23 from the displacement of the boom means when it is being moved in the centering action to bring the drilling machine from reference point P'o in the drilling pattern plane to reference Po on the working plane established immediately before the drilling face.

The converter 25 is arranged to convert the values for the reference point P'o ($Q'_B$) derived from the working distance and direction values of the boom means from the arithmetic unit 23, into values for reference point P'o ($Q'_A$) in the rectangular coordinate system ($Q'_A$), and is also coupled to a central processing unit 18 to feed, by instruction from the central processing unit 18, the values for the reference point P'o ($Q'_A$) to a register (III) 21.

A memory means 15 is provided to store the drilling pattern including the values for the reference point $P_0$ and drilling point $P_3$ in the drilling pattern plane $S_1$ in terms of the rectangular coordinate system $Q_A$ so as to provide the valves necessary for directly positioning the distal end of the boom means 1 at the drilling positions and in the drilling directions at various points in the drilling pattern plane values of the working distance and the working direction of the boom means 1. The values are set as desired, for example, by dial means (not shown), etc. The memory means 15 coupled to the central processing unit 18 is further arranged to supply, in response to instruction from the central processing unit 18, the values for the reference point $P_O$ in terms of the rectangular coordinate system $Q_A$ to the register (III) 21 connected to the memory means 15 during the centering operation, and also to supply the values for the drilling point $P_3$ in terms of the rectangular coordinate system $Q_A$ to an arithmetic unit 24 coupled to the memory means 15 during the drilling operations. The register (III) 21 connected supplys the values for the point $P'_O$ from the converter 25 to the arithmetic unit 24 together with the values for the point $P_0$ received from the memory means 15. The arithmetic unit 24 calculates the value for drilling point P'3 in the working plane in terms of the rectangular coordinate system ($Q'_A$) based on the values for the drilling point P3 fed from the memory means 15 and the values for the reference point Po and the reference point P'o fed from the register (III) 21, and supplys the calculated values for the drilling point P'3 to the converter 17. The converter 17 converts the values for the drilling point P'3 from the rectangular coordinate system $Q'_A$ into values for the drilling point P'3 in terms of the boom coordinate system $Q'_B$, mainly values of the working distance and the working direction of the boom means. A register (I) 19 is provided between the converter 17 and a positioning servo control unit 16 for storing the values for the drilling point P'3 ($Q'_B$) fed from the converter 17 and for transfer of said values to said positioning servo control unit 16.

The positioning servo control unit 16 is connected to the boom means 1 to move the drilling machine into the desired drilling position relative to the working plane S2, and is connected to the arithmetic unit 23 which feeds back the values of the position of the boom means 1 to the positioning servo control unit 16 for comparing this value with the value given by the converter 17. A drilling machine control unit 22 which controls the drilling operation of the drilling machine 8 which has been brought to the desired drilling position P'3 is connected to the positioning servo control unit 16 for receiving a signal from the positioning servo control unit 16 when the drilling machine 8 has reached the drilling position P'3 as a result of the operation of the positioning servo control unit 16, and for outputting a termination signal for ending the drilling operation of the drilling machine to the positioning servo control unit 16 at the desired time. The drilling machine control unit 22 is also connected to the central processing unit 18 for supplying a termination signal to said unit 18 which is in turn connected to the first and second converters 17 and 25 for instructing them to carry out the necessary conversions. A register (II)20 is connected between the first and second converters 17 and 25 to provide constant values such as the lengths $l_1$ and $l_2$ of the first and second booms 2 and 3 of the boom structure 1.

It should be noted here that, the memory unit 15, positioning servo control unit 16, central processing unit 18, drilling machine control unit 22 and arithmetic units or detectors 23, can be known devices or such as those disclosed, in Japanese Laid Open Utility Model Application Jitsukaisho 50/121001 and Japanese Laid Open Patent Application Tokkaisho 50/121101, both published in 1975, and therefore, a detailed description thereof is omitted for brevity. For starting the drilling operation, the truck and the like for the drilling machine is positioned to face the working plane $S_2$ established according to the actual working face, and the distal end of the boom structure 1 is brought into adjusted to center on the reference point $P'_O$ of the working plane $S_2$ by supplying hydraulic fluid to the hydraulic cylinders 5 and 11-14 to move the boom structure. The values of the displacement of the hydraulic cylinders 5 and 11-14 are changed to the values of the working distance and the working angle of the boom structure 1 by the arithmetic means 23, thereby to obtain the values for the reference point $P'_O(Q'_B)$ of the boom structure 1 in the boom coordinate system. The value for the reference point $P'_O(Q'_B)$ thus obtained are immediately converted by the second converter 25 from the boom coordinate system to the rectangular coordinate system for obtaining the values for the point $P'_O(Q'_A)$. The values for the reference point $P_O$ in the drilling pattern plane and that of the reference point $P'_O$ are temporarily stored in the register (III)21. Thereafter, upon instruction from the central processing unit 18, the drilling point $P_3$ is taken out from the memory means 15 and entered into the arithmetic unit 24 together with the values for the points $P_O$ and $P'_O$ from the register (III)21 so as to obtain from the above equation (4) the values for drilling point $P'_3$. The values for the point $P'_3$ are further fed into the first converter 17 to be converted into values for the drilling point $P'_3 (Q'_B)$ in the boom coordinate system and or temporarily stored in the output register (I)19. On the basis of the values for said point $P'_3(Q'_B)$, the boom structure 1 is positioned by the servo control unit 16, and thereafter the drilling operation of the drilling machine 8 under the control of the drilling machine control unit 22 is carried out. Upon completion of the drilling operation at the point $P'_3$ $(Q'_B)$, the information is supplied to the positioning servo control unit 16 and the central processing unit 18, and under instructions from the central processing unit 18 the memory means 15 supplies values for further drilling points $P_4, P_5 \ldots$ and $P_n$ into the arithmetic unit 24 to obtain the values for the further drilling points $P'_4, P'_5 \ldots P'_n$. Such a procedure as described above is sequentially repeated until the drilling operation based on the desired drilling pattern is completed.

As is clear from the foregoing description, in the centering arrangement for a drilling machine according to the present invention, the boom structure at the reference point on the drilling pattern plane is shifted to the correct position of the reference point on the working plane, and the amount of shifting is converted from a boom coordinate system to rectangular coordinate system by converter means, and then used to adjust or correct distance and direction values for a desired drilling point by an arithmetic unit so that the desired drilling point on the drilling pattern plane is brought into coincidence with the actual drilling point on the working plane for achieving the ideal drilling pattern for the boom structure. Thus it is possible to carry out the centering of a desired drilling pattern on a working plane quickly and accurately without the necessity for mechanically shifting the position of the truck or the like on which the drilling apparatus is mounted. Furthermore, by the arrangement according to the present invention as described above, the centering can be readily effected by any one without any particular skill and labor by operation for a short period of time, and with sufficiently high accuracy. Moreover, the arrangement according to the present invention includes no special mechanical components so that it is not only low in manufacturing cost, but readily usable in any type of truck, so that it has a wide variety of applications.

It should be noted here that in the foregoing embodiment, although the present invention is mainly described with reference to the centering arrangement for the drilling machine mounted on the boom structure, the concept of the centering arrangement according to the present invention is not limited in its application to such a centering arrangement for a drilling machine alone, but may readily be applicable to centering arrangements for various other equipment mounted on boom structures.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A centering arrangement for a drilling machine or the like which comprises,
   boom means on which the drilling machine is operably mounted;
   first arithmetic means connected to said boom means for calculating values of first working distance and working direction from a reference point on a drilling pattern plane to an actual reference point on a working plane immediately in front of a working face to be drilled, said first working distance and direction being calculated in a boom coordinate system and being provided as output from said first arithmetic means;
   first converter means connected to said first arithmetic means for converting the values of said first working distance and direction from said boom coordinate system to a rectangular coordinate system, and providing said converted values as outputs;
   a memory means for storing coordinate values of said reference point and a desired drilling point in said drilling pattern plane, said coordinate values being in said rectangular coordinate system and being supplied as output from said memory means;

second arithmetic means connected to said memory means and said first converter means for receiving the outputs of said first converter means and said memory means and for processing these values to calculate values of second working distance and working direction from said actual reference point to an actual drilling point in said working plane, said actual reference point and said actual drilling point in said working plane corresponding to said reference point and said desired drilling point in said drilling pattern plane, said second working distance and working direction being calculated in said rectangular coordinate system and being provided as output from said second arithmetic means;

a second converter means connected to said second arithmetic means for converting said second working distance and direction values from the rectangular coordinate system to the boom coordinate system, and providing said converted values as output; and, positioning servo control means connected to said second converter means and to said boom means for displacing said boom means according to said second working distance and direction supplied as output from said second converter means for bringing the drilling machine into adjustment with the actual drilling point in the working plane, and also coupled to said first arithmetic means for receiving the values for said actual drilling point calculated by said first arithmetic means as feedback upon displacement of the boom means.

2. A centering arrangement as claimed in claim 1, further comprising a central processing unit coupled to said memory means and said first and second converter means for instructing said memory means to supply values therefrom and instructing said first and second converter means to supply converted values therefrom in the proper sequence to said second arithmetic unit and said positioning servo control unit.

3. A centering arrangement as claimed in claim 1, further including drilling machine control means connected to said drilling machine and said positioning servo control means for controlling the drilling operation of said drilling machine after it has been moved to the actual drilling point.

4. A centering arrangement as claimed in claim 1, further including;

a first register connected between said second converter means and said positioning servo control means for storing the second working distance and direction values for the actual drilling point supplied from said second converter means for transfer of said values to said positioning servo control means, a second register connected to said first and second converter means for storing and feeding constant values for said boom means to said first and second converter means, and a third register connected to said first converter means, said memory means and said second arithmetic means for storing the coordinate values supplied from said memory means for transfer of said values to said second arithmetic means.

5. A method for centering a drilling machine or the like by moving a boom means on which the drilling machine is operably mounted, said centering method comprising the steps of, displacing the boom means from a reference point in a drilling pattern plane to an actual reference point in a working plane immediately in front of a working face to be drilled in order to center the drilling machine at said actual reference point;

calculating the values of first working distance and working direction from said reference point in said drilling pattern plane to said actual reference point in said working plane, said first working distance and working direction being in a boom coordinate system;

converting said first working distance and direction values from the boom coordinate system to a rectangular coordinate system;

supplying coordinate values of said reference point and a desired drilling point in said drilling pattern plane, said coordinate values being in said rectangular coordinate system;

calculating second working distance and direction from said actual reference point to an actual drilling point in said working plane, said actual reference point and said actual drilling point in said working plane corresponding to said reference point and said desired drilling point in said drilling pattern plane, said second working distance and working direction being calculated in said rectangular coordinate system;

converting said second working distance and direction values from the rectangular coordinate system to the boom coordinate system;

displacing said boom means according to said second working distance and direction values to being the drilling machine into adjustment with the actual drilling point of the working plane; and, feeding back the second working distance and direction values calculated upon displacement of the boom means to control said displacing of said boom means.

* * * * *